Figure 1:
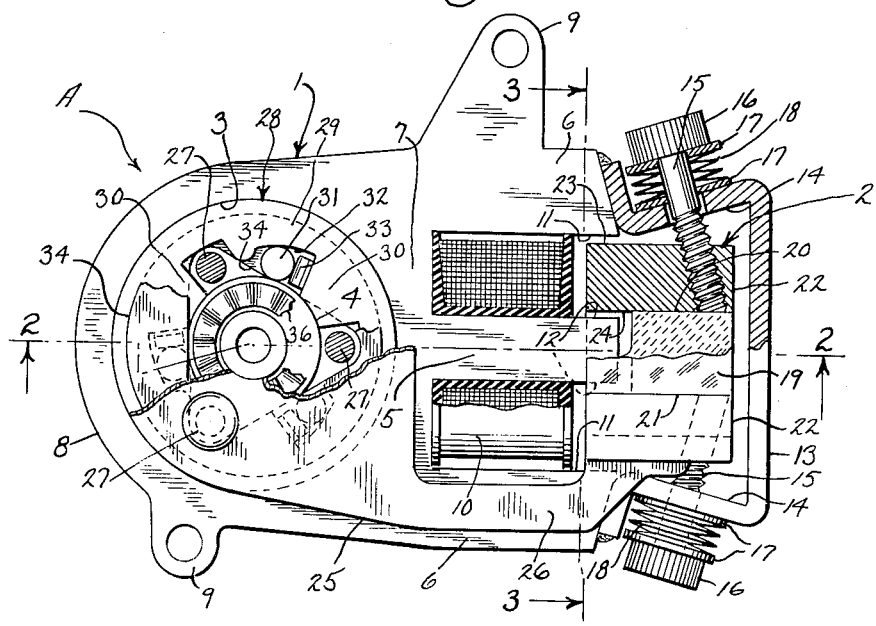

Aug. 24, 1965   J. S. NEAL   3,202,849
OSCILLATORY MOTOR
Filed May 17, 1962   6 Sheets-Sheet 1

INVENTOR
James S. Neal
BY
Arthur H. Seidel
ATTORNEY

Aug. 24, 1965   J. S. NEAL   3,202,849
OSCILLATORY MOTOR
Filed May 17, 1962   6 Sheets-Sheet 2

INVENTOR
James S. Neal
BY
Arthur H. Seidel
ATTORNEY

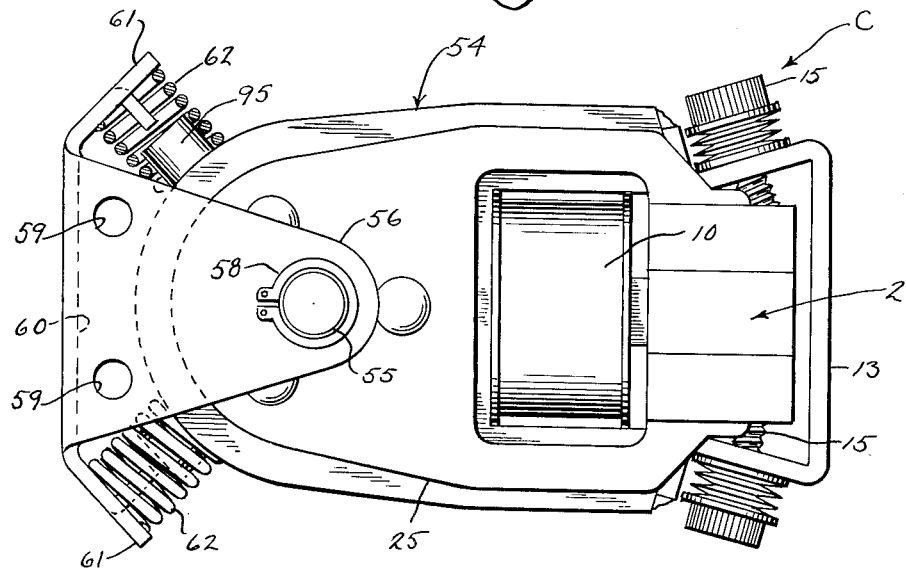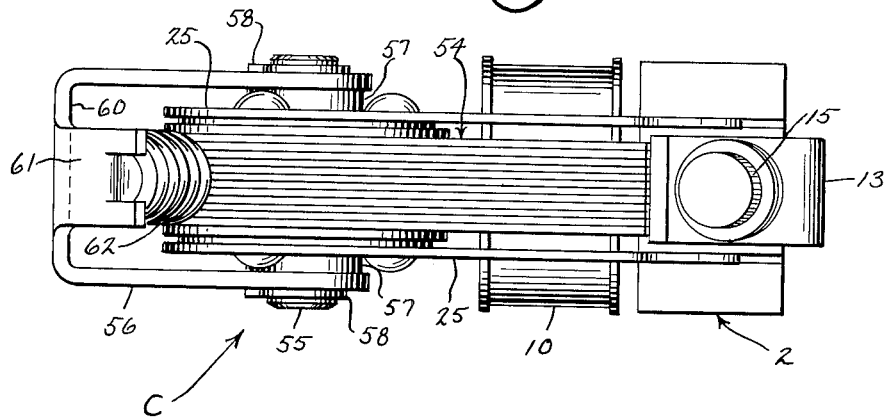

Aug. 24, 1965  J. S. NEAL  3,202,849
OSCILLATORY MOTOR
Filed May 17, 1962  6 Sheets-Sheet 4
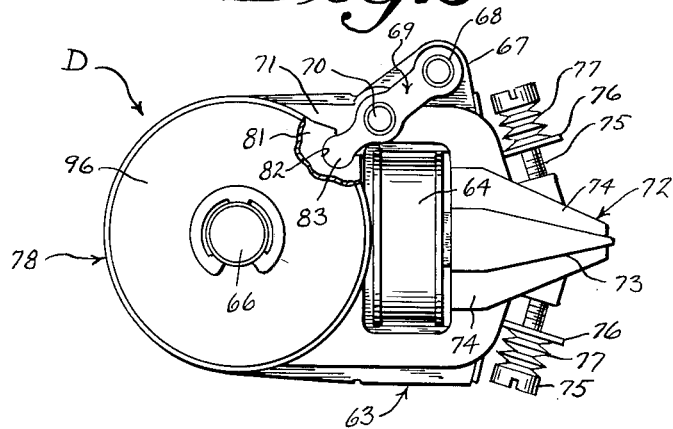
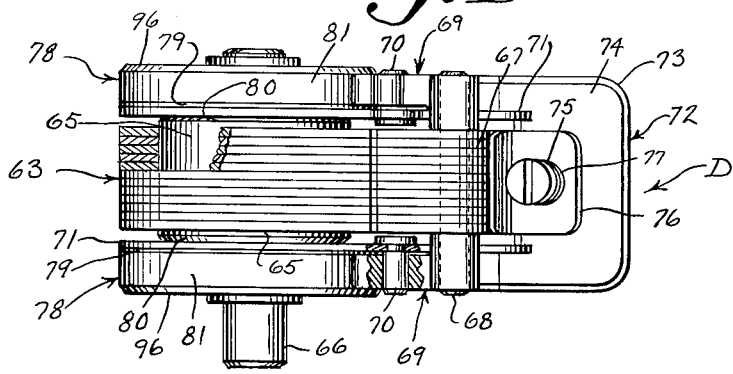
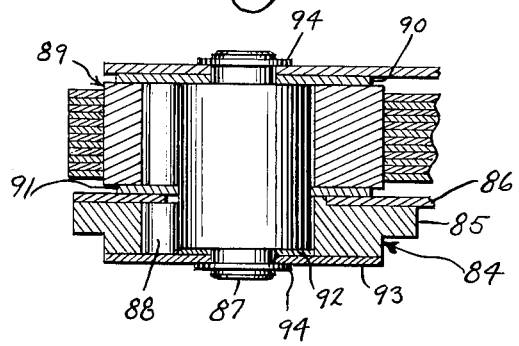
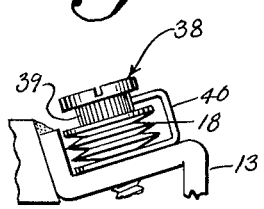
INVENTOR
James S. Neal
BY
Arthur H. Seidel
ATTORNEY Aug. 24, 1965    J. S. NEAL    3,202,849
OSCILLATORY MOTOR
Filed May 17, 1962    6 Sheets-Sheet 5

INVENTOR
James S. Neal
BY Arthur H. Seidel
ATTORNEY

INVENTOR
James S. Neal
BY
Arthur H. Seidel
ATTORNEY

United States Patent Office 3,202,849
Patented Aug. 24, 1965

3,202,849
OSCILLATORY MOTOR
James S. Neal, Chicago, Ill., assignor to
Enercon, a partnership
Filed May 17, 1962, Ser. No. 195,467
36 Claims. (Cl. 310—37)

This invention relates to electric motors useful for providing a slow output shaft speed in which a pair of magnetic members have an oscillatory movement with respect to one another and a coupling is provided between the members and the output shaft to translate the oscillatory movement into a rotary one.

The usual alternating current motor with a rotating armature is inherently a high speed device in which shaft speed is directly proportional to the source frequency and indirectly proportional to the number of poles. Such a motor cannot, by itself, be constructed to provide a low shaft speed, and hence it is the usual practice to connect the motor to its load through a gear reduction train whenever a low output speed is desired. The total expense of motor and gear reduction may substantially exceed that of a motor alone, and the gear train presents additional parts that may wear and prematurely fail. These factors are of particular concern in small motor applications.

In the present invention a slow shaft speed alternating current motor of small size is provided which dispenses with a gear reduction train as has commonly been used. The motor is of an oscillatory type in which magnetic members oscillate with respect to one another in short, rapid strokes. These oscillations are translated to an output shaft through clutching members as incremental steps of rotation. Broadly, this approach of translating oscillations into rotary movement has been previously attempted, but it is not believed that any constructions of this nature have had any general acceptance. Deficiencies of such prior devices are overcome by the present motor, which motor may be compacted to obtain space saving for any given output rating, and which may have increased life to ensure greater reliability.

The motor, as described herein in several of its embodiments, has a pair of relatively oscillatory magnetic members with each member having a source of magnetic flux. These members terminate in magnetic poles, with the poles of one member being placed in close proximity to the poles of the other to develop strong magnetic forces. The poles of each magnetic member present a set of four working pole areas, and each pole area of each member faces a pole area of the opposite member to define a short working gap that enhances the value of flux density. In usual operation the magnetic polarities of the pole areas of one member are fixed, and the magnetic polarities of the pole areas of the other member periodically reverse with time to develop intermittent forces of attraction between associated pole areas. The particular geometry for the magnetic members may reside in a number of configurations, some of which are described herein by way of illustration.

The motor may incorporate a number of construction techniques that make it highly versatile, so as to find application in fields not heretofore possible for the oscillatory type motor. For example, control springs can be employed to bear against the movable magnetic member to alternately undergo compression as such member oscillates toward and away from the opposite magnetic member. Spring compression arrests each oscillation to eliminate the high impact that would otherwise occur between the facing pole areas of the magnetic members. Thus, these magnetic members can have their pole areas directly face one another and move in a collision course to develop effective torque, yet they will not collide and deliver sharp impact blows to one another, whereby long life is obtained while utilizing the full advantage of short working gaps between members. Power output and life are thus both enhanced, and furthermore, by providing for spring adjustment the oscillatory stroke length is controlled to obtain both a variation in output torque and a variable speed control for the output shaft.

The operation, characteristics and features of the motor of this invention may be better understood in detail after study of the following description of some of the specific embodiments which the motor may take. Accordingly, further discussion of such aspects is deferred to the end of the description. It suffices at this point to enumerate a number of objects and advantages which are obtainable from the motor.

It is one object of the invention to provide a motor that may operate from either an alternating current or direct current source and has a low output shaft speed accomplished without employment of any gear reduction. The expense of a gear reduction is thereby eliminated, together with mechanical failures that may occur in the parts of such device. Also, with the elimination of a gear reduction there is no need for the amounts of lubricant necessary for a gear train or for oil seals.

It is another object to reduce the size and weight of slow speed motors by translating motion from an oscillatory magnetic member to an output shaft through the use of clutch members closely surrounding the shaft.

It is another object to provide a novel construction for magnetic members of an oscillatory motor in which each member has its individual source of magnetic flux to develop enhanced torque output.

It is another object to provide an electric motor having a control for varying the rate of rotation of the output shaft through a range of very low speeds.

It is another object to provide a low speed electric motor which may utilize any of a number of forms of clutching arrangements as torque translating mechanisms between an oscillating member and an output shaft.

It is another object to provide an oscillatory type electric motor in which permanently magnetized materials may be utilized in the development of the driving forces.

It is another object to provide an oscillatory type electric motor in which the mechanical oscillation of one magnetic member with respect to another completes only one complete cycle of movement for each electrical cycle of an impressed alternating voltage, whereby shaft speeds may be maintained at a very low value.

It is another object to provide an oscillatory movement in which both directions of oscillation between two magnetic members may be utilized as power strokes, the power being developed by a separate source of magnetic flux for each member.

The motor of the present invention has a wide variety of applications, and the versatility of the motor is exemplified by noting some of its end uses, which include photocopy machines, humidifiers, television tuners, vending machines, clock wind-up and adjustment mechanisms, timer setting mechanisms, drives for stepper switches, servo mechanism drives, applications where a slow shaft speed motor is required which can drive over-riding loads, rotisseries, toys, display signs, pencil sharpeners, can openers, office machines, garage doors and other applications.

The foregoing and other objects and advantages of the invention will appear from the description to follow. In the description, reference is made to the accompanying drawings which form a part hereof and in which there is shown by way of illustration several specific embodiments in which this invention may be practiced. These embodiments will be described in sufficient detail to enable those skilled in the art to practice the invention, but it is to be understood that other embodiments of the invention may be used and that structural changes may be made in the embodiments described without departing from the scope of the invention. Consequently, the following detailed description is not to be taken in a limiting sense; instead, the scope of the present invention is best defined by the appended claims.

Figure 2:
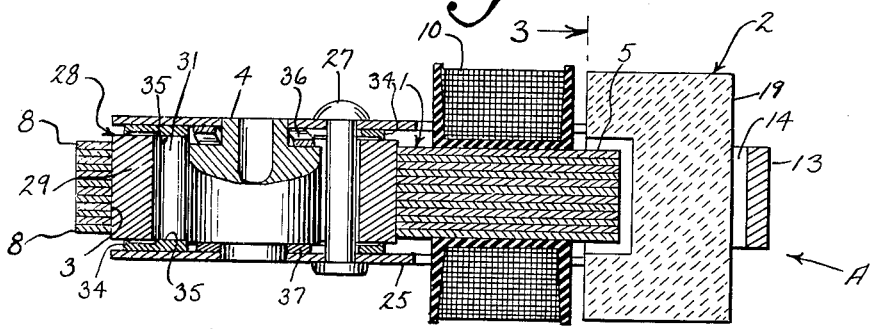
Figure 3:
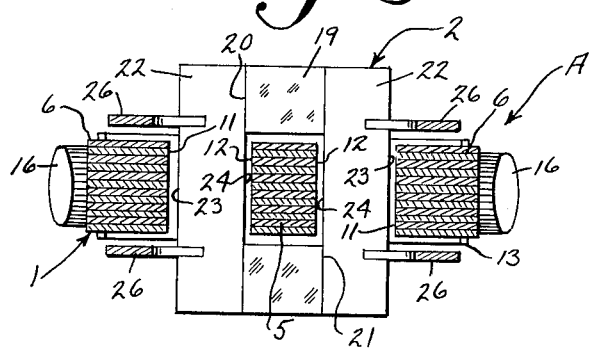
Figure 4:
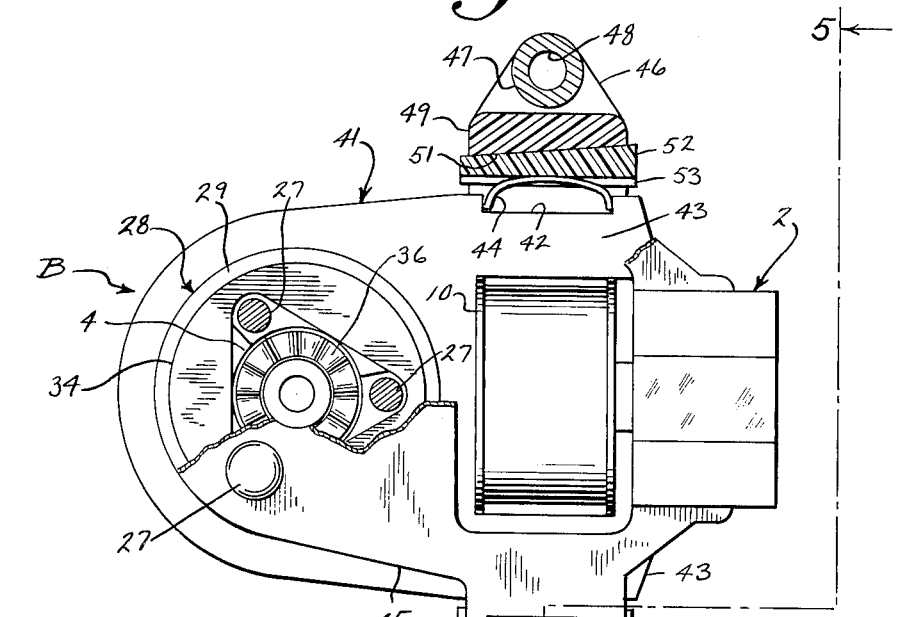
Figure 5:
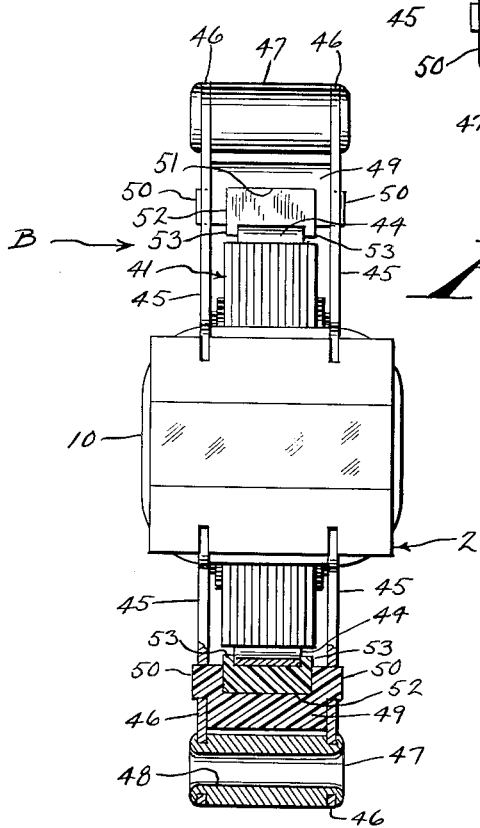
Figure 12:
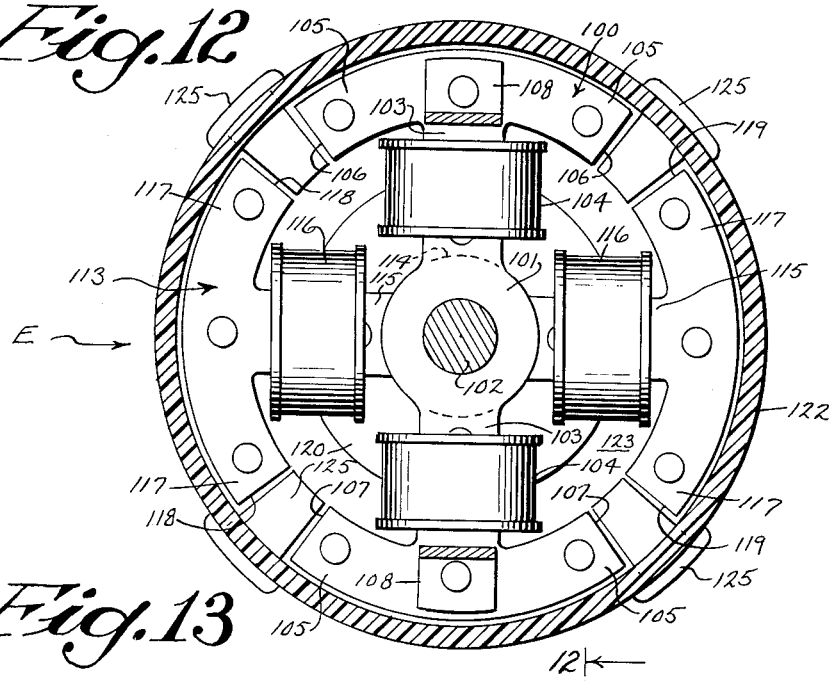
Figure 13:
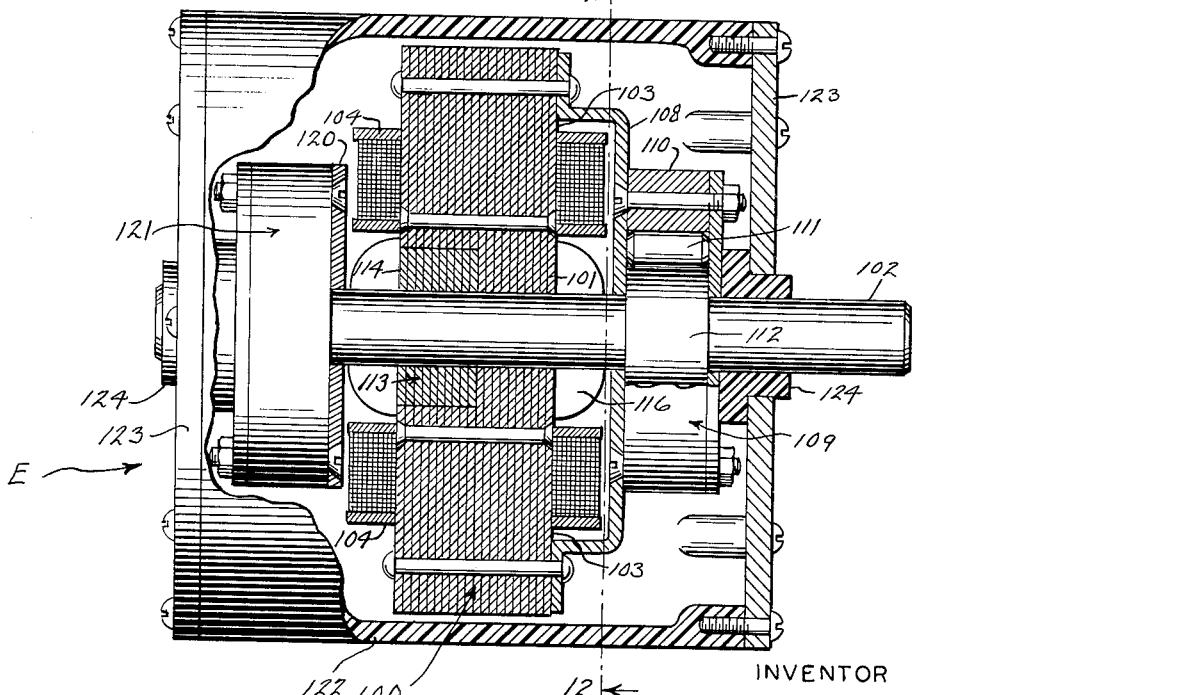
Figure 14:
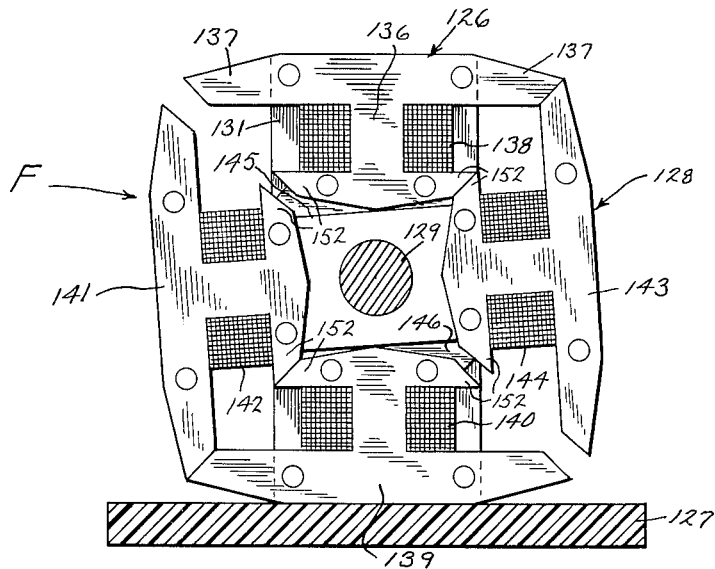
Figure 15:
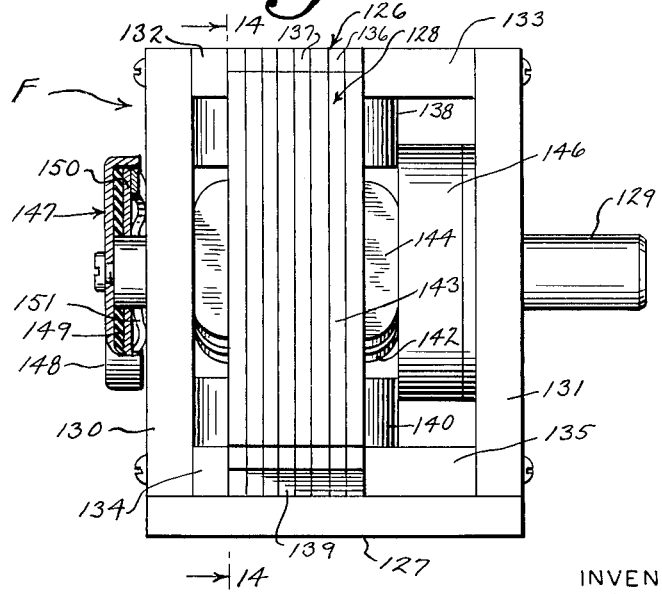

In the drawings:

FIG. 1 is a top view with parts broken away and in section of an embodiment of the motor that is designated as embodiment A, FIG. 2 is a view in section of the motor of embodiment A taken through the plane 2—2 indicated in FIG. 1, FIG. 3 is a view in section of the motor of embodiment A taken through the plane 3—3 indicated in FIG. 1, FIG. 4 is a top view of a second embodiment B, which is similar to embodiment A, but with a modified form of control spring for the oscillatory magnetic member, FIG. 5 is an end view of embodiment B which is partially in section as indicated by the plane 5—5 in FIG. 4, FIG. 6 is a top view of another motor, designated embodiment C, similar to that of FIG. 1 in which modifications have been made to provide resilient mounting of the magnetic members, FIG. 7 is a side view in elevation of embodiment C, FIG. 8 is a top view, with parts broken away, of still another embodiment, designated by the reference character D, in which the motor has a power drive for each mechanical oscillation to thereby achieve a continuous drive throughout both the mechanical and electrical cycle, FIG. 9 is a side view in elevation of embodiment D with parts broken away and in section, FIG. 10 is a fragmentary view in section of a modified clutch arrangement that may be used in the practice of the invention, FIG. 11 is a fragmentary view of an adjusting screw used for a variable speed motor, FIG. 12 is a view in section of an embodiment E which is taken through the plane 12—12 shown and designated in FIG. 13, FIG. 13 is a side view of embodiment E with parts broken away and in section, FIG. 14 is a view of an embodiment F which is taken through the plane 14—14 shown and designated in FIG. 15, and FIG. 15 is a side view of embodiment F with parts broken away and in section.

Referring now to FIGS. 1–3, the oscillatory motor A shown therein has a stationary laminated magnetic member 1 that constitutes the largest single structural member, and associated with the magnetic member 1 is a second magnetic member 2 in the form of an oscillatory armature that is positioned at the right hand end of member 1, as viewed in FIGS. 1 and 2. The laminations of the stationary member 1 are punched from suitable magnetic steel, and when stacked in final assembly they present a semi-circular left hand end for the member 1 with a circular opening 3 that houses an output shaft 4 and clutching mechanism to be described. The right hand end of the stationary member 1 presents a three-legged magnetic circuit comprising a central leg 5 and a pair of spaced side legs 6 that parallel the central leg 5. A yoke portion 7 magnetically connects the legs 5–6 with one another at their inner, or left hand, ends and integrally merges the three-legged portion of the member 1 with the semi-circular shaped left hand end. The two outside laminations 8 are provided with mounting ears 9 for securing the motor A in place.

A wound coil 10 is mounted upon the central leg 5, and upon current flow in the coil 10 magnetic flux will be established within the magnetic member 1 which passes through the central leg 5 and branches, at the inner end of the leg, through the yoke portion 7 into each of the side legs 6. The magnetic flux also branches at the right hand, or outer, end of the central leg 5 to pass across to the spaced outer ends of each side leg 6. A working pole area 11 is thus defined along the side surfaces of the outer end of each side leg 6, and a pair of working pole areas 12 are also defined along the side surfaces of the central leg 5. As indicated in FIG. 1, each working pole area 12 of the central leg 5 faces an associated working pole area 11 of the adjacent side leg 6. The pair of pole areas 12 of the central leg 5 lie to one magnetic side of the coil 10 and have the same magnetic polarity, and the pair of pole areas 11 of the side legs 6 lie to the opposite magnetic side of the coil 10 and are of opposite polarity from the areas 12. Upon a reversal of current flow in the coil 10 there will be an accompanying reversal of magnetic polarity for each set of pole areas 11 and 12, and hence upon connecting the coil 10 to a source of alternating current the polarity of the pole areas will alternate with time, the pair of areas 11 always having an opposite polarity from that of the areas 12.

A snubber bracket 13 is mounted upon and bridges between the outer ends of the side legs 6 to encircle the right hand end of the armature 2. Each end of the bracket 13 is bent in the form of a short, outwardly extending spring mounting portion 14 having an opening that passes an adjustment screw 15. As seen in FIG. 1, the screw heads 16 lie outside the bracket 13, and the shanks of the screws 15 extend inside the area bounded by the bracket 13 to engage the armature 2. Interposed between each screw head 16 and the associated bracket portion 14 is a pair of spring seat washers 17 and a Belleville type control spring 18.

The armature 2 is mounted for a reciprocating, or oscillatory movement with respect to the stationary member 1, and it has a permanently magnetized center portion 19 that is preferably formed as a ferrite block, but which may also be comprised of other magnetized materials. This center portion 19 is positioned directly outward from the right hand end of the central leg 5, and as shown in FIG. 2 the ferrite block 19 extends both above and below the laminated member 1 with a cut out notch to permit a short overlapping with the upper and lower surfaces of central leg 5. The ferrite block 19 is of the class of hard ferrite and is magnetized to present a magnetic pole of one polarity along one of its side faces 20 and a magnetic pole of opposite polarity along its other side face 21.

A pair of armature pole pieces 22 of magnetic material are secured to each side of the central ferrite block 19, and as particularly shown in FIG. 1 each pole piece 22 presents a leg extending into the space between the central leg 5 and a side leg 6 of the member 1. Thus, the three-legged construction of the magnetic member 1 and the two-legged construction of the magnetic armature 2 are interdigited, with each armature pole piece 22 presenting a working pole area 23 directly facing and closely spaced from a working pole area 11 of a side leg 6 and a second working pole area 24 directly facing and closely spaced from a working pole area 12 of the central leg 5. Absent the presence of alternating flux due to coil 10 the working pole areas of each armature pole piece 22 will have a magnetic polarity like that of the side of the ferrite block 19 to which the piece 22 is secured. Thus, each magnetic member 1, 2 presents a set of four working pole areas with one pair being disposed on one magnetic side of a magnetic flux source and the second pair being on the opposite magnetic side of the flux source. Further, the two pole areas of each pair face pole areas from different pairs of the other magnetic member and facing areas are closely spaced to present short working gaps across which the magnetic flux passes. Preferably, these gaps are formed by pole areas that are in the direct path of relative movement to have the flux pattern normal to the pole area surface.

Each armature pole piece 22 has a canted threaded opening that receives the threaded shank of one of the adjustment screws 15. The screws 15 are turned down to place the control springs 18 under compression when the armature 2 is in the centered position of FIG. 1, and hence as the armature 2 oscillates toward either side leg 6 one spring will be further compressed while the other spring will expand. The mounting of the armature 2 further consists of a pair of sheet metal side plates 25 that overlay the top and bottom of the laminated member 1. In FIG. 1 the upper side plate 25, which is broken away to expose underlying construction (an entire side plate of like configuration is shown in the embodiment C of FIG. 6), is seen to include arms 26 at its right hand end which extend alongside the coil 10 and terminate in feet that are inserted in cooperative slots in the armature pole pieces 22. The lower side plate 25 is of similar configuration, and the semi-circular left hand ends of the plates 25 are concentric with the central opening 3 of the member 1. The ends of the output shaft 4 extend through openings in the side plates 25, so that the oscillatory movement of the armature 2 is a short pivot about the shaft 4, and a set of three rivets 27 hold the plates 25 together with a clutching assembly therebetween that will now be described.

A clutch 28 is housed within the circular opening 3 of the stationary magnetic member 1 which includes a spider 29 that is press fitted into the laminations. As seen in FIG. 1, the spider 29 has a set of three inwardly extending radial spokes 30 which closely receive and position the radially enlarged central hub portion of the output shaft 4. A set of three clutch rollers 31 are placed in the clutch spider 29 to bear against both the hub portion of the shaft 4 and helical races 32 that extend circumferentially from each spoke 30. Each roller 31 has an associated wave shaped bias spring 33 that bears along one side against a spoke 30 and along its opposite side against the roller 31. Thus, each roller 31 is urged by its bias spring 33 into a wedging position between the shaft 4 and the associated helical race 32, so that upon attempted rotation of the shaft in a counter-clockwise direction, as viewed in FIG. 1, the shaft will be braked to preclude such rotation. On the other hand, a rotation of the shaft 4 in a clockwise direction will release the wedging fit of the rollers 31 to enable free rotation of the shaft in this direction.

A pair of washers 34 formed from a synthetic material are disposed between the side plates 25 and the clutch spiders 29. As seen in FIG. 2, each washer 34 is slightly cup shaped about its outer circular edge to provide a dust tight enclosure, and also includes raised bosses 35 on its inner face which receive and seat the ends of the clutch rollers 31. As seen in FIG. 1 (and also in embodiment B of FIG. 4), each washer 34 has a triangular shaped inner opening that passes about the rivets 27 at its vertices. Also disposed within the triangular opening of the upper washer 34 is a ring shaped wave spring 36 which bears against the inner surface of the upper side plate 25 and against the hub portion of the shaft 4. A friction ring 37 of suitable material is tightly held between the inner surface of the lower side plate 25 and the radially enlarged hub portion of the shaft 4, so that the wave spring 36 acts to place the shaft 4 in tight engagement with the lower side plate 25 through the medium of the friction ring 37.

When the armature 2 oscillates clockwise, as viewed in FIG. 1, the side plates 25 have a corresponding pivoted movement which drives the output shaft 4 through the tight engagement of the friction ring 37. The shaft 4 is free to rotate in this direction, since the clutch rollers 31 are disengaged from their wedging position, as previously described, and hence the shaft 4 will receive an incremental rotational movement through the medium of the clutching, or gripping action of the friction ring 37 and spring 36. Upon a return oscillation of the armature 2 in the opposite direction, which completes one cycle of oscillation, the corresponding movement of the side plates 25 will urge the shaft 4 to turn in a like direction by virtue of the tight engagement of the ring 37. However, the shaft 4 will slip with respect to the side plates 25 and ring 37 because the clutch rollers 31 will wedge between their associated races 32 and the hub of the shaft 4 to hold the shaft 4 stationary during the return oscillation. Thus, the output shaft 4 is driven in one direction of rotation in a sequence of stepped movements that correspond with motions of the armature 2 in one of its alternate oscillatory strokes.

With the coil 10 of the motor A connected to a source of alternating current the armature 2 will complete one cycle of mechanical movement, that is one counterclockwise movement followed by one clockwise movement, for each electrical cycle. This frequency of mechanical cycling is one half the rate of those oscillatory motors in which the armature has no separate source of magnetic flux and responds with a complete mechanical cycle for each energization of the actuating coil that occurs in each electrical half cycle. By provision of an additional source of flux for the armature 2 there is a sensing of the polarity of the alternating flux that reduces the frequency of mechanical oscillation, so that the output shaft speed is halved to achieve very slow speeds and to reduce inertia factors.

Hard ferrite, and by this term is meant that group of ferrites utilized as permanent magnets, has exhibited excellent properties as a source of magnetic flux for the armature 2. Also, it presents a high reluctance that precludes any substantial alternating flux established by the coil 10 from passing through the central portion of the armature, wherefore the alternating flux field that extends from the working pole areas 12 at the outer end of the central leg 5 to the pole areas 11 of the side legs 6 passes through the leg ends of the armature pole pieces 22 without any appreciable entry into the rest of the armature. A coil may be substituted for the ferrite to have two electromagnets, or the positions of the coil and the permanent magnet may be reversed. In either form each magnetic member has a source of magnetic flux wherein one source will establish a flux alternating with respect to the other. When two coils are employed with low reluctance magnetic steel the resultant flux field patterns may vary from that of the high reluctance circuit described, and will depend partly on mutual effects between coils.

The control springs 18 provide resilient snubbers that serve to brake the armature 2 and limit its oscillatory stroke by presenting a load to the armature that abruptly increases at the end of the oscillation. The particular form of spring 18 used in the motor A comprises a number of tiered frusto-conical spring sections commonly known as Belleville springs. Each spring 18 is placed under sufficient compression to remain compressed throughout the stroke of the armature 2, so that no noise and vibration of free parts occurs. As a spring 18 is worked into a higher state of compression its sections flatten and become fully compressed one against the other. This compression is substantially noise-free and full flattening presents an abruptly increased load to the armature 2 that limits the extent of armature stroke. The spring loading, then, can be termed nonlinear, in that initial spring loading will have a relatively light spring rate characteristic that suddenly changes upon reaching a flattened condition to the characteristic of a non-compressible abutment. The transition to the condition of reaching a point of no further compression is achieved, by use of the Belleville spring, in a manner that reduces impact stresses and noise. The armature stroke can then be controlled so that wear between the working pole areas of the magnetic members 1, 2 is not a limiting factor, while at the same time permitting use of closely spaced pole areas that are in direct facing relation with one another. The springs 18 play an additional role, in that the storage of spring energy upon being compressed provides a driving force upon commencement of the armature return stroke that enhances the initial thrust of the stroke.

Adjustment of the springs 18 may further provide a control over motor shaft speed. By moving the screws 15 inward to advance the point in the armature stroke at which the springs 18 compress the length of stroke will be reduced. Output shaft speed will accordingly be decreased, and in the fragmentary view of FIG. 11 there is shown an adjustable control screw 38 with a ratchet 39 engaged by a click 40 which can be utilized for a variable speed motor. Speed adjustment may also be made in initial manufacture, with the screws 15 being set in permanent position at that time. This adjustment also varies motor output torque, so that a particular motor size can be inventoried and then adjusted to meet a variety of speed and torque applications. Control of the source frequency can also be used to govern motor speed, and the coil 10 can be connected through suitable switching means to a direct current source for this purpose, as will be understood by those versed in the art.

Referring now to FIGS. 4 and 5 there is shown a motor B in which the control springs take a different form from those shown in motor A of FIG. 1–3. Elements of the motor B which are like corresponding elements in motor A have had the same designating reference numerals applied thereto, and it may be noted at the outset of the description of motor B that the clutch elements housed at the left hand side of the motor are identical to those in motor A, but that the laminated magnetic member 41 of motor B is permitted to oscillate while its armature 2 is held stationary. By reason of this reversal between the movement of the magnetic members the clutch 28 is used to drive the output shaft 4 while the friction ring, not shown in FIGS. 4 or 5, is utilized to hold the output shaft 4 from reverse rotation. Thus, the motor of the invention may be operated with either of the magnetic members having an oscillatory motion with respect to the other.

Referring now more specifically to the particular construction in FIGS. 4 and 5 that differs from that of motor A, it will first be observed that the laminated magnetic member 41 has a pair of transverse extending channels 42 cut into the outside faces of its side legs 43. Generally U-shaped springs 44 made from flat stock are disposed within channels 42, with their ends fitting into the channel corners. Side plates 45 are similar to the side plates 25 of motor A, with the addition of outwardly extending brackets 46 at each side of the motor which overlay the channels 42. The brackets 46 of one side plate are in alignment and paired with the brackets of the other side plate, and received between each pair of brackets 46 is a tubular spacer 47 presenting a mounting hole 48 for the motor B.

Mounted just to the inside of each spacer 47 is a molded block 49 having a pair of ears 50 that are inserted through mating openings in the brackets 46 to retain the blocks 49 securely in place. Each block 49 has inwardly facing groove 51 that is at a slight angle, as shown in the upper part of FIG. 4, and received in the grooves 51 are spring seat wedges 52 that engage the upper crowned portions of the springs 44 to hold the springs 44 in a state of compression. Each wedge 52 is moved along its inclining interface with its block 49 to adjust the compression of the associated spring 44, and it is then secured in such position by a suitable adhesive such as an epoxy resin or the like. Each wedge 52 also has side ridges 53, as shown in FIG. 5, that retain its spring 44 from sideward movement.

In the operation of motor B the springs 44 perform similarly as the control springs of motor A. The characteristic curve of a spring such as shown in FIGS. 4 and 5 presents, during initial compression, a response in which spring pressure increases at a moderate rate with compression, and then a transition region is encountered in which the spring rate sharply increases with further compression. Hence, for larger deflections a much greater force is required to compress the spring, and as the magnetic member 41 moves in one of its oscillations so as to compress one of the springs 44 the spring reacts with an increasing force that abruptly increases as the working pole face areas of the two magnetic members closely approach one another. This suddenly increased spring load brakes the movement of the magnetic member 41 to transfer the act of deceleration from physical engagement between magnetic members to the springs themselves. Upon a return oscillation of the magnetic member 41 the spring that had been compressed expands, and the other spring then is compressed to again prevent sharp impact blows between the magnetic members. Thus, the springs 44 of motor B also present a non-linear spring characteristic presenting greatly increasing loading as pole face working areas closely approach one another, and this is similar to the operating characteristic of motor A of FIGS. 1–3, wherein the springs 18 are compressed to the point that unyielding elements brake further movement of the oscillating magnetic member. With such restriction upon the physical engagement between magnetic members, as has been described for both embodiments A and B motor life is enhanced and quietness of operation is achieved.

In some applications it may be desirable to resiliently mount the stationary magnetic member, as well as the oscillatory magnetic member. Such an arrangement is shown in FIGS. 6 and 7, wherein there is shown a motor C similar to motors A and B, and to which like designating reference numerals have been applied to parts like those of the embodiments A, B. In FIGS. 6 and 7 the laminated magnetic member 54 does not have the mounting ears as shown in motor A of FIG. 1, and to mount the motor the output shaft 55 is extended at each end to receive the ends of a U-shaped mounting bracket 56. A spacing washer 57 is inserted between each side plate 25 and the bracket 56, and retaining rings 58 are inserted in suitable grooves in the shaft 55 to hold the parts in place.

The bracket 56 is provided with suitable mounting holes 59 and a central web 60 terminates in a pair of spring seats 61 that turn about the curved left hand end of the laminated magnetic member 54 in positions normal to radii of the output shaft 55. Interposed between the spring seats 61 and the magnetic member 54 are compression springs 62 which tightly encircle bosses 95 formed from the laminations of the member 54 and work against the bosses 95 to hold the member 54 in position with respect to the mounting bracket 56.

A motor of the form of FIGS. 6 and 7 is particularly quiet since vibrations imparted to the stationary magnetic member are dampened. A characteristic of an oscillatory motor is that under load the oscillatory member may not advance in one of its torque transmitting oscillations to the same extent as it advances in its return oscillation not under load. As a consequence, the oscillatory member may move further in one direction than the other, and there is greater likelihood of having pole face area engagement upon the no-load return stroke of the oscillatory member. Any such engagement that may occur under load is dissipated in the motor C by the absorption of the impact blow by the coil springs 62, and quietness of operation is enhanced In FIGS. 8 and 9 there is shown a motor D having a power stroke for every oscillation of the movable magnetic member, and in such motor D the output shaft speed will double that of the motors A, B and C, all other factors being alike. The motor D has a laminated magnetic member 63 with the characteristic three legged construction of previous described embodiments. A coil 64 is mounted upon the central leg, and the left hand side, as viewed in FIGS. 8 and 9, of the laminated member 63 houses a clutch 65 comprising a spider, rollers and bias springs similar as prior described clutches, wherein the clutch spider rotates with the oscillatory movement of the laminated member 63, so that in one direction of oscillation the clutch 65 engages an output shaft 66 to rotate the same and in the return oscillation the clutch freely rides over the shaft 66.

The laminated magnetic member 63 is particularly characterized by a transverse ridge 67 that receives a tightly fitted pivot shaft 68. Each end of the pivot shaft 68 overhangs from the magnetic member 67 to receive a freely pivoted link 69. Each link 69 is also pivoted near its center on a pin 70 that extends from a side plate 71. The pair of side plates 71 encircle the output shaft 66, as in motors A–C, with a close fit that permits free turning of the shaft, but which positions the side plates 71 with respect to the other elements of the motor. The side plates 71 support a second magnetic member 72 having a central ferrite portion 73 and two side pieces 74 that present legs interdigited with the legs of the magnetic member 63, similarly as in previously described motors. Each of the side pieces 74 receives an adjustment screw 75 which extends through an L-shaped snubber bracket 76 mounted at the end of a side leg of the laminated member 63, and each adjustment screw 75 has associated springs 77 similar to those shown in FIGS. 1 and 6.

A pair of side clutches 78 with covers 96 are mounted upon the output shaft 66 alongside the outer faces of the side plates 71. A washer 79 is disposed between each side plate 71 and the adjacent clutch 78, and another washer 80 is placed between each side plate 71 and the central clutch 65 housed within the laminated member 63. The side clutches 78 are also similar to clutches hereinbefore described, in that each comprises a clutch spider 81 together with a set of rollers and associated bias springs (not shown), and they are arranged so that both the central clutch 65 and side clutches 78 will engage the output shaft 66 in the same direction of rotation, for example clockwise rotation as viewed in FIG. 8.

The clutch spiders 81 each have a socket 82, as shown in FIG. 8, that receives a rounded end 83 of a link 69. Thus, each link 69 rotates about its center connection with a side plate 71 when the laminated member 63 oscillates in a reciprocating motion, and the resulting rocking motion of the links 69 oscillates the side clutches 78 in a like reciprocating action.

In the operation of the motor D the central clutch 65 will be turned in one direction while the side clutches 78 are turned in the opposite direction, and during a succeeding oscillation each clutch will reverse its direction, so that the central clutch 65 will again be turning in a direction opposite from the side clutches 78. For example, upon a clockwise oscillation of the laminated magnetic member 63 the inner clutch 65 will turn in a like direction about the shaft 66, and engage the shaft to drive it. At the same time each of the links 69 will pivot about its connection with its associated side plate 71 to move its rounded end upward, as viewed in FIG. 8, to impart counterclockwise rotation to its side clutches 78. The side clutches 78 will then be free from the output shaft, and they are retreated, so as to be readied for torque transmission upon the succeeding oscillation.

In the succeeding oscillation the laminated magnetic member will move counterclockwise, as viewed in FIG. 8, so that the central clutch 65 will be freed from the output shaft and retreated with respect thereto. In the meantime the links 69 are being pivoted so as to move the side clutches 78 in a clockwise rotation, in which they grip the output shaft 66 and apply torque thereto. As a result, the output shaft 66 is driven continuously at twice the speed of a motor having one power stroke for each cycle of oscillation and at approximately twice the output torque. Hence, the motor of this invention can be operated at a greater speed and with greater torque by the provision of dual clutching.

A further modification of the motor of the invention is shown in FIG. 10, wherein the friction ring 37 and flat wave spring 36 of motor A are removed and a clutch member 84 is installed in place thereof. The spider 85 of the clutch 84 is secured to a side plate 86 with an epoxy resin, or other suitable adhesive, or if desired it may be riveted in place. The radially enlarged portion of the output shaft 87 is extended down into the spider 84 and rollers 88 are disposed between the shaft 87 and the spider 84, so that upon a movement of the side plates, which in this embodiment oscillate to transmit driving torque, the clutch 84 will drive the shaft 87 during one oscillation and release from the shaft during the next oscillation. This alternate grasping and release of the output shaft 87 alternates with the grasping and release of a clutch 89, which is like the clutch shown in motors A and B, and which functions to retain the output shaft from reversing during a return oscillation of the side plates.

To complete the modification of FIG. 10 suitable washers 90 and 91 are inserted at the sides of the clutch 89 and a third washer 92 is inserted between the lower end of the shaft 87 and the clutch 84. Also, retaining rings 94 are disposed in suitable grooves in the ends of the output shaft 87 to hold the parts from endwise movement.

The configuration of the magnetic elements of the motor may reside in geometries quite distinct from that of the embodiments A–D, and there is shown in FIGS. 12 and 13 an oscillatory motor E having a generally cylindrical outer conformation in which two relatively movable magnetic members, each with a source of magnetic flux, oscillates through short strokes with respect to one another and present a set of four working pole face areas for each member as in embodiments A–D. These pole areas are each disposed in facing relation to an associated pole area of the opposite magnetic member to define short working air gaps, thus the magnetic arrangement is like that of the motors A–D. More specifically, the motor E of FIGS. 12 and 13 has a first laminated magnetic member 100 that extends vertically across the interior of the motor with a central hub portion 101 mounted upon an output shaft 102. The hub 101 pivots freely about the shaft 102, so that the member 100 and shaft 102 may turn independently of one another. Radially extending coil mounting portions 103 branch outward from opposite sides of the hub portion 101 to mount a pair of energizing coils 104, and the outer ends of the radial portions 103 divide into circumferentially extending pole portions 105. The upper pole portions 105 terminate at their ends in circumferentially facing working pole areas 106, and the lower pole portions 105 terminate in similar working pole areas 107.

A diametrically extending clutch mounting bracket 108, see FIG. 13, is secured to one side of the magnetic member 100 and mounts a clutch 109 which encircles the shaft 102. The clutch 109 is again similar to the other clutch structures described herein, and it includes a clutch spider 110 that moves with the bracket 108, a set of clutch rollers 111 interposed between the spider 110 and a hub 112 fast on the shaft 102, and suitable roller biasing springs (not shown).

The motor has a second magnetic member 113 that also is freely pivoted upon the shaft 102. This magnetic member 113 extends crosswise of the motor at an angle of about 90° from the member 100, and is of a similar construction. A hub portion 114 (see FIG. 13) rides on the shaft 102, radially extending coil mounting portions 115 branch from the hub 114, a set of coils 116 encircle the portions 115 and circumferentially extending pole portions 117 terminate in working pole areas 118 and 119 respectively. One of the pole areas 118 faces a pole area 106, and the other pole area 118 faces one of the pole areas 107. Similarly, one of the pole areas 119 faces an associated pole area 106, and the other pole area 119 faces an associated pole area 107. The hubs 101, 114 are each one-half the axial thickness of a magnetic member, as shown in FIG. 13, so that the two members 100, 113 can be mounted in axial alignment upon the shaft 102, and so that magnetic flux may pass freely from one member to the other. The member 113 has a clutch bracket 120 which mounts a clutch 121 that is like the clutch 109.

The magnetic members 100, 113 are mounted in a cylindrical shell 122 that is closed at its ends by a pair of non-magnetic shroud plates 123. The plates 123 support bearings 124 which in turn mount the shaft 102, and to complete the motor a set of four magnetic motion limiting abutments 125 are set in the shell 122, as illustrated in FIG. 12. The abutments 125 limit the travel of the magnetic members 100, 113 to short pivotal strokes, and also retain the correct spatial relation for the members. The abutments 125 further serve to conduct magnetic flux between the associated pole areas, so that the working air gaps remain short. If desired, the circumferential extent of the magnetic abutments 125 may be increased, with an accompanying shortening of the pole portions 105, 117, and since the magnetic abutments 125 act as low reluctance flux conductors the facing relation of pairs of working pole areas separated by short working gaps remains the same, even though the pole areas may physically be moved apart from one another.

For operation of the motor E the set of coils 104 may be connected to a direct current source to establish a component of magnetic flux in the member 100 with one magnetic polarity for the upper set of pole areas 106 and the opposite polarity for the lower set of pole areas 107. The set of coils 116 will be connected to a source of alternating current to establish an alternating flux component in the member 113 in which the flux passing through one coil 116 will be in the same direction as the flux passing through the other coil 116. Hence, if the interplay between direct current and alternating current fluxes be disregarded the left hand pole areas 118 will have an alternating flux component for one half cycle that presents one polarity while the right hand pole areas 119 will be of opposite polarity, and during the succeeding half cycle the polarities due to alternating flux will be reversed.

For those half-cycles in which the polarity of the upper pole areas 106 is the same as the polarity of the left hand pole areas 118 the magnetic member 100 will rotate clockwise and the magnetic member 113 will rotate counterclockwise. Magnetic flux passing upwardly through the upper coil 104 will branch to the right and pass through the right hand pole area 106, the associated abutment 125 and hence through the upper pole area 119. These pole areas will also move into engagement with the interposed abutment 125, and the flux will return through the right hand coil 115, then from the hub of the magnetic member 113 to the member 100 to pass through the upper coil 104. A similar flux field will involve the left hand coil 116 and the lower coil 104 together with the lower pole area 118 and the left hand pole area 107, these pole areas converging upon the lower left abutment 125.

In the succeeding half cycle the reversal of magnetic flux established by the coils 116 will cause attraction between the pole areas which had moved apart on the previous half cycle. Thus, the magnetic members 100, 113 will each oscillate in short strokes, with one moving counterclockwise while the other moves clockwise. The clutches 109, 121 will alternately engage and disengage with the shaft 102 to rotate the shaft in one direction. While the clutch 109 acts to drive the shaft 102, say during a clockwise oscillation of the member 100, the clutch 121 disengages during the corresponding counterclockwise oscillation of the member 113, so as not to place any counter-torque upon the shaft. During a counterclockwise oscillation of the member 100 the clutch 109 will disengage from the shaft 102, and at this time the clutch 121 will grip the shaft 102 in its clockwise motion, to thereby continue to deliver output torque to the shaft 102.

A further embodiment F is shown in FIGS. 14 and 15, wherein one magnetic member 126 is mounted as a stationary member upon a base 127 and a second magnetic member 128 pivots freely about an output shaft 129. The stationary member 126 has a pair of spaced vertical rising side supports 130 and 131 which join with horizontal spacers 132 and 133 at the top of the member and 134 and 135 at the bottom of the member. An upper laminated magnetic portion 136 is held between the upper spacers 132, 133 which has a pair of pole pieces 137 branching in opposite directions, as viewed in FIG. 14, and also mounts an energizing coil 138. A lower magnetic portion 139 with a coil 140 is constructed similarly as the upper portion 136.

The oscillatory magnetic member 128 is similar to the stationary member 126, with a left hand magnetic portion 141 that mounts a coil 142 and a right hand magnetic portion 143 that mounts a coil 144. The magnetic portions 141, 143 are tied together by a block 145 that pivots freely about the shaft 129, and as shown in FIG. 15 a clutch 146 is mounted on the block 145 of the movable member 128 to drive the shaft 129 during oscillations of the member 128 in one of its two directions of movement. To hold the shaft 129 from reversing a brake 147 is mounted on the left hand end of the shaft 129 that comprises a cupped disc 148 secured to the shaft end, a friction ring 149, a metal disc 150 and a wave spring 151. It may be observed that in embodiment F the brake 147 and clutch 146 have their functions reversed from the clutch and brake of embodiment A of FIGS. 1–3, in that the clutch 146 is now driving the output shaft and the brake 148 presents the retarding force against which the shaft 129 works at all times. Hence, the terms clutch and brake are both used to cover driving and retarding devices, since they are interchangeable in function and each serves as a clutching member acting upon an output shaft.

In the motor F of FIGS. 14, 15 the coils 138, 140 may be joined to a direct current source to provide fixed magnetic polarities in the magnetic portions 136, 139, and the other coils 142, 144 are then connected to an alternating current source to provide alternating polarities for their associated working pole areas. Thus, as in the other embodiments, there is provided a pair of relatively movable magnetic members each having a source of magnetic flux and each presenting at least four working pole areas that are spaced from associated working pole areas of the other member.

Instead of having the magnetic flux return through hub portions surrounding the output shaft, as in motor E of FIGS. 12 and 13, the embodiment F has its hub portions moved radially outward a slight amount to present the short magnetic legs 152 which are disposed on the radially inner sides of each of the coils 138, 140, 142, 144. These legs 152 then complete flux paths like those described for embodiment E, and the motor F thus illustrates an alternative form for the geometry of a reciprocating motor that embodies the magnetic principles present in each of the motors described herein.

In the foregoing description the operation and characteristics of the motor members has been discussed. An additional feature is that a stalled condition will not endanger the motor winding or injuriously load the mechanical members. In the magnetic circuit of motor A the working gap length is a constant, and the reactance loading of the coil 10 remains substantially the same, so that rapid closure of any of the gaps is not essential for maintaining energizing currents within safe values, as in some forms of oscillatory devices.

The attainment of a variable speed output for an alternating current motor is accomplished without complex additional elements, and no commutator is needed as in direct current drives. The motor is also compact, and a size reduction is obtained by placing the clutching members within one of the two magnetic parts of the motor. Also, high torque outputs, both during starting and running, are attained while still achieving small overall size.

While the clutching members described herein are clutch and brake type devices ratchet mechanisms may also be utilized. Another feature is the use of a permanent magnet in one magnetic member that presents a high reluctance to the magnetic flux component derived from a winding in the other magnetic member. The alternating flux field is thereby confined and a general pattern for the field is established and maintained throughout a cycle of operation. This is one specific form of the novel arrangement in which each of two magnetic members, each with a source of magnetic flux, presents a set of four working pole areas that are in spaced relation to a like set of the other member. Each set of four areas comprises a first pair disposed on one magnetic side of the associated magnetic flux source, and a second pair disposed on the opposite magnetic side of the flux source. Further, the two poles areas of a pair form working gaps with one pole area from each of the two pairs of the other magnetic member.

I claim:

1. In an electric motor the combination comprising: a first magnetic member having a source of magnetic flux which leads from one side of such source to branch into a first pair of pole areas and which leads from the other side of such source to branch into a second pair of pole areas; and a second magnetic member relatively movable in a reciprocating motion with respect to said first magnetic member, said second member having a source of magnetic flux and leading from one side of such source to branch into a third pair of pole areas of which one faces a pole area of said first pair of pole areas and the other faces a pole area of said second pair of pole areas, and said second member leading from the other side of its magnetic flux source to branch into a fourth pair of pole areas of which one faces a pole area of said first pair of pole areas and the other faces a pole area of said second pair of pole areas.

2. A motor as set forth in claim 1 which has a winding for the source of magnetic flux of said first magnetic member and a high reluctance permanent magnet for the source of magnetic flux of said second magnetic member.

3. In an electric motor the combination comprising: a pair of relatively movable magnetic members having an oscillatory movement with respect to one another, the first of said members presenting a first set of four working pole areas through which magnetic flux passes to establish a first pair of poles of one magnetic polarity and a second pair of poles of opposite magnetic polarity, the second of said members presenting a second set of four working pole areas through which magnetic flux passes to establish a third pair of poles of one magnetic polarity and a fourth pair of poles of opposite magnetic polarity said third pair of pole areas being spaced in flux conducting relation with one pole area from each of said first and second pair of poles, and said fourth pair of pole areas also being spaced in flux conducting relation with one pole area from each of said first and second pair of poles; and a source of magnetic flux for each member in which the magnetic flux of one member alternates in direction with respect to the magnetic flux of the other member to provide intermittent attraction between spaced pole areas.

4. A motor as in claim 3 having a rotatable output shaft; one of said magnetic members pivoted upon said shaft for oscillatory movement; a first clutching member connecting said magnetic member with said shaft to impart rotation in one direction to the shaft, and a second clutching member connected with the shaft to restrain rotation in the opposite direction.

5. In an electric motor the combination comprising: an output shaft; a pair of magnetic members that have a relatively oscillatory movement in which at least one member oscillates about said shaft; a magnetic flux path for the first of said members having a portion for accommodating a source of magnetic flux said path leading from one side of said portion and branching to present a first pair of pole areas, and said path also leading from the other side of said portion to branch into a second pair of pole areas; a second magnetic flux path for the second of said magnetic members having a portion for accommodating a second source of magnetic flux, said second path leading from one side of its said portion and branching to present a third pair of pole areas, and said second path also leading from the other side of its said portion to branch into a fourth pair of pole areas; said magnetic members being positioned with each pole area of a member magnetically opposing a pole area of the other member; and a source of magnetic flux for each member, with one of said sources alternating in polarity to cause intermittent attraction between opposing pole areas to produce oscillatory movement for driving said output shaft.

6. The motor of claim 5 in which a clutch is interposed between a magnetic member oscillating about said shaft, and a brake is connected to said shaft to retard rotation in one direction of movement.

7. In an electric motor the combination comprising: an output shaft; a first magnetic member pivoted at its center on said shaft with opposite ends extending radially from the center, each end terminating in a pair of working pole areas through which magnetic flux passes, such pole areas facing substantially circumferentially in opposite directions to one another; a source of magnetic flux for said first magnetic member; a second magnetic member pivoted at its center on said shaft with opposite ends extending radially from the center, each end terminating in a pair of working pole areas through which magnetic flux passes, such pole areas facing substantially circumferentially in opposite directions to one another and also having each disposed in working relation to a pole area of said first member to present a working gap therebetween whereby magnetic flux passing through the gap develops forces of attraction; a second source of magnetic flux for said second magnetic member; and one said sources of magnetic flux being adapted to alternate in polarity to develop intermittent attractive forces between pairs of pole areas disposed in working relation to one another.

8. In an electric motor the combination comprising: an output shaft; a first magnetic member pivoted at its center on said shaft with opposite ends extending radially from the center, each end terminating in a pair of working pole areas through which magnetic flux passes, such pole areas facing substantially circumferentially in opposite directions to one another; a second magnetic member pivoted at its center on said shaft with opposite ends extending radially from the center, each end terminating in a pair of working pole areas through which magnetic flux passes, such pole areas facing substantially circumferentially in opposite direction to one another with each being paired with a pole area of said first member to have magnetic flux passing through one pole area of a pair pass through the other pole area of the pair to develop working forces; and magnetic flux establishing means for said magnetic members adapted to develop attractive forces between said magnetic members.

9. In an electric motor the combination comprising: a first magnetic member having a center leg and a pair of outer legs spaced from the center leg, wherein each outer leg presents a magnetic pole area, and said center leg presents a pair of magnetic pole areas each of which is paired with a pole area of an outer leg; a source of magnetic flux for said first magnetic member; a second magnetic member having a pair of legs each disposed magnetically between an outer leg and the center leg of said first magnetic member, and each such leg presenting a pair of pole areas, one being spaced from a pole area of the outer leg and the other from a pole area of the inner leg of the first magnetic member; and a second source of magnetic flux for said second magnetic member.

10. The motor of claim 9 in which the source of magnetic flux for said first magnetic member is a coil wound on said center leg adapted for connection to an alternating current source, and said second source of magnetic flux is a permanently magnetized member disposed between said pair of legs which presents a path of relatively high reluctance through said second magnetic member.

11. In an electric motor the combination comprising: a first magnetic member having a central leg, a pair of side legs spaced from the central leg, and a yoke that joins the legs at one end of each and which extends into a clutch mounting portion; a coil upon said central leg; a first clutching member secured with said clutch mounting portion; an output shaft extending within said first clutching member; a second magnetic member having a pair of legs interdigited with the legs of said first magnetic member and having a permanent magnet disposed between said pair of legs; supporting plate means for said second magnetic member pivotally mounting said member about said output shaft; and a second clutching member interposed between said supporting plate means and said output shaft.

12. A motor as in claim 11 having spring means interposed between said first and second magnetic members.

13. A motor as in claim 12 having resilient mounting means for said first magnetic member.

14. In an electric motor the combination comprising: a first magnetic member having a central leg, a pair of side legs spaced from the central leg, and a yoke portion joining the legs at one end of each; a source of magnetic flux for said first magnetic member; a second magnetic member having a pair of legs each disposed between said central leg and a side leg; a second source of magnetic flux for said second magnetic member; and output shaft; first clutching means interposed between said first magnetic member and said output shaft; and second clutching means interposed between said second magnetic member and said output shaft.

15. An electric motor as in claim 14 having a non-linear spring control means interposed between said first and second magnetic members.

16. A motor in accordance with claim 15 in which the spring control means includes Belleville type springs.

17. A motor in accordance with claim 15 in which the spring control means includes a U-shaped spring held in compression between the crown of the central part of the U-shape and the ends of the U-shape.

18. In an electric motor the combination comprising: an output shaft; a first magnetic member pivotally movable about said shaft; a second magnetic member with respect to which said first member oscillates in short alternating movements; a first clutching member engageable with said shaft and secured to said first magnetic member to pivot with the same, said clutching member gripping the shaft in one direction of pivot and releasing from the shaft in the opposite direction of pivot; a second clutching member pivotal with respect to and engageable with said shaft for gripping the shaft in the same direction of pivot as said first clutching member grips the shaft and releasing from the shaft in said opposite direction of pivot; and a linkage between said first magnetic member and said second clutching member for pivoting said second clutching member in the direction opposite to the direction of pivot of said first magnetic member.

19. In an electric motor the combination comprising: a first magnetic member presenting a first set of four working pole areas through which magnetic flux passes to establish a first pair of poles of one magnetic polarity and a second pair of poles of opposite polarity; a first source of magnetic flux for said first magnetic member; a second magnetic member presenting a second set of four working pole areas through which magnetic flux passes to establish a third pair of poles of one magnetic polarity and a fourth pair of poles of opposite magnetic polarity said third pair of pole areas being spaced in flux conducting relation with one pole area from each of said first and second pair of poles, and said fourth pair of pole areas also being spaced in flux conducting relation with one pole area from each of said first and second pair of poles, said second member being movable in an oscillatory motion with respect to said first member in which the second set of working pole areas move toward and away from the first set of working pole areas in a line of movement that is a collision course with said first set of pole areas; a second source of magnetic flux for said second magnetic member, with one of said sources being a high reluctance permanent magnet; and spring means bearing against said second magnetic member resisting motion of said second member to dampen striking engagement of said sets of working pole areas, said spring means presenting sharply increasing braking upon the second magnetic member at a point in compression to thereby brake the motion of said second member.

20. An electric motor of claim 19 in which said spring rests against an adjustable spring seat, and adjustment of said spring seat varies the stroke of said second member.

21. In an electric motor the combination comprising: a magnetic member with a set of flux conducting legs extending therefrom; an output shaft; a magnetic armature with a set of flux conducting legs interdigited with said first set of legs for oscillatory movement of the armature legs transversely of the gaps between legs; coupling means between said armature and said shaft to impart rotation to said shaft from oscillations of said armature; and a pair of springs working against said armature in opposed directions which are substantially in the direction of oscillation.

22. A motor of claim 21 in which said springs compress to present non-linear braking force that sharply increases after an initial amount of compression.

23. A motor of claim 22 in which each spring rests against an abutment that is adjustable in position, and wherein abutment adjustment alters output shaft speed.

24. In an electric motor the combination comprising: a first magnetic member; a second magnetic member having an oscillating motion with respect to said first magnetic member; an output shaft; first clutch means interposed between said second magnetic member and shaft to rotate the shaft during an oscillation of said second magnetic member in one direction; a linkage joined to said second magnetic member with an end that moves in a direction with respect to said shaft that is opposite to the direction of movement of said second magnetic member; and second clutch means interposed between said linkage end and shaft to rotate the shaft in the same direction as said first clutch means during oscillation of the second magnetic member in the opposite direction.

25. In an electric motor the combination comprising: a first magnetic member having a central leg and a pair of side legs which are magnetically joined at one end and which present gaps between one another at their opposite ends; an operating coil linking said central leg; a second magnetic member having a permanent magnet forming a central part thereof and a pair of legs extending from opposite sides of the central part with their ends disposed between the ends of said central and side legs of said first magnetic member; one of said magnetic members being movable with the legs thereof advancing and retreating from the legs of the other magnetic member in an oscillatory movement; an output shaft; a first clutch member interposed between the movable magnetic member and said shaft for driving the shaft during oscillation of the member in one direction; a linkage joined to said moveable magnetic member with an end that moves in a direction with respect to said output shaft that is opposite to the direction of movement of said movable magnetic member; and a second clutch member interposed between the end of said linkage and said shaft for driving the shaft during oscillation of the member in the other direction.

26. In an electric motor the combination comprising: a first magnetic member having a hub portion with a central opening and extending from the hub portion into a magnetic circuit portion that presents a set of outwardly extending legs, magnetically connected at their iner ends and presenting spaced outer ends; a source of magnetic flux for said first magnetic member; an output shaft extending through said central opening; a clutch interposed between said shaft and the hub portion of the first magnetic member that unites the hub portion and shaft upon attempted rotation in one direction and that permits rotation of the shaft in the other direction, a second magnetic member having a set of legs with spaced ends that are in flux conducting relation to the ends of the legs of the first member and being magnetically connected to one another at their opposite ends, said second magnetic member having a mounting portion overlying said first magnetic member with a shaft joining portion covering said central opening that has a bearing engagement with said shaft; a source of magnetic flux for said second magnetic member; and a friction clutch interposed between said shaft and said shaft joining portion of said mounting portion.

27. In an electric motor the combination comprising: a magnetic member of stacked laminations having a hub with a central opening and having a set of three legs, comprising a central leg and two side legs, extending outward from the hub with free ends that present gaps therebetween; a coil mounted on said central leg; a one way clutch inserted in said central opening; an output shaft extending through said clutch for free rotation with respect to said magnetic member in one direction only said shaft including a hub with a shoulder of enlarged diameter; a two legged armature with its legs extending between the legs of said magnetic member for oscillation with respect thereto, said armature including a permanent magnet between its legs; a mounting plate for said armature that encircles said shaft and reciprocates about the shaft; and gripping means between said mounting plate and said shaft.

28. An electric motor as in claim 14 wherein said second magnetic member oscillates, said second clutching means grips said shaft in one direction of oscillation of said second magnetic member and imparts incremental rotation thereto; and said first clutching means grips said shaft when said second magnetic member oscillates in the other direction.

29. An electric motor as in claim 14 wherein said first magnetic member oscillates, said first clutching means grips said shaft in one direction of oscillation of said first magnetic member and imparts incremental rotation thereto, and said second clutching means grips said shaft when said first magnetic member oscillates in the other direction.

30. An electric motor as in claim 14 wherein said first clutching means has race surfaces and means that wedge against and release from said race surfaces, and said second clutching means comprises a constant friction engagement between said second magnetic member and said output shaft.

31. An electric motor as in claim 14 wherein both said first and second clutching means comprise race surfaces and means that wedge against and release from said race surfaces.

32. In an electric motor the combination comprising: a first magnetic member having a central leg, a pair of side legs spaced from the central leg, and a yoke portion joining the legs at one end of each; a first source of magnetic flux for said first magnetic member; a second magnetic member having a pair of legs with each being disposed between the center leg and a side leg of said first magnetic member; a second source of magnetic flux for said second magnetic member; said magnetic members being relatively oscillatable, an output shaft; and coupling means between the oscillatable magnetic member and said output shaft which imparts incremental rotation to said shaft for one direction of oscillation.

33. A motor in accordance with claim 32 in which one of said sources of magnetic flux is a high reluctance permanent magnet.

34. A motor in accordance with claim 1 in which the reciprocating motion places facing pole areas in a collision path and there are spring means opposing reciprocating motion that arrest such movement short of destructive impact between facing pole areas.

35. In an electric motor the combination comprising: an output shaft; a pair of relatively oscillatable members each encircling said shaft; a resilient mounting for one of said members; the first of said members having a magnetic center leg and magnetic side legs spaced from the center leg with a magnetic yoke portion tying the legs together at one end thereof; first clutching means between said first magnetic member and said shaft; the second of said members having a pair of magnetic legs each between a side leg and the center leg of said first member; second clutching means between said second member and said shaft; and a separate source of magnetic flux for each of said members.

36. A motor in accordance with claim 35 in which one magnetic source is a high reluctance permanent magnet.

References Cited by the Examiner

UNITED STATES PATENTS

| | | | |
|---|---|---|---|
| 614,645 | 11/98 | Bird | 74—143 |
| 1,733,872 | 10/29 | Graseby | 310—37 |
| 1,851,543 | 3/32 | Bosard | 74—126 X |
| 2,096,458 | 10/37 | Johnson | 74—126 |
| 2,958,793 | 11/60 | Lonnquist | 310—37 |

FOREIGN PATENTS 583,815  11/24  France.

MILTON O. HIRSHFIELD, *Primary Examiner.*

ORIS L. RADER, *Examiner.*